US011956168B2

(12) United States Patent
Ernström et al.

(10) Patent No.: US 11,956,168 B2
(45) Date of Patent: Apr. 9, 2024

(54) PRS DESIGN BY EXTENDING THE BASIC SIGNAL

(71) Applicant: Telefonaktiebolaget LM Ericsson (publ), Stockholm (SE)

(72) Inventors: Per Ernström, Stockholm (SE); Ritesh Shreevastav, Upplands Väsby (SE); Johannes Nygren, Uppsala (SE); Deep Shrestha, Linköping (SE); Erik Stare, Sollentuna (SE); Florent Munier, Västra Frölunda (SE); Satyam Dwivedi, Solna (SE); Sara Modarres Razavi, Linköping (SE); Fredrik Gunnarsson, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 495 days.

(21) Appl. No.: 17/278,845

(22) PCT Filed: Sep. 27, 2019

(86) PCT No.: PCT/EP2019/076282
§ 371 (c)(1),
(2) Date: Mar. 23, 2021

(87) PCT Pub. No.: WO2020/065052
PCT Pub. Date: Apr. 2, 2020

(65) Prior Publication Data
US 2022/0038232 A1 Feb. 3, 2022

Related U.S. Application Data

(60) Provisional application No. 62/738,882, filed on Sep. 28, 2018.

(51) Int. Cl.
*H04L 5/00* (2006.01)
*H04W 4/029* (2018.01)

(52) U.S. Cl.
CPC .......... *H04L 5/0048* (2013.01); *H04L 5/0053* (2013.01); *H04W 4/029* (2018.02)

(58) Field of Classification Search
CPC ... H04L 5/0048; H04L 5/0053; H04L 5/0094; H04W 4/029; H04W 24/10
See application file for complete search history.

(56) References Cited

U.S. PATENT DOCUMENTS

| 2013/0308567 A1 | 11/2013 | Chen et al. |
| 2017/0285132 A1 | 10/2017 | Fischer |

(Continued)

FOREIGN PATENT DOCUMENTS

| WO | 2010105225 A1 | 9/2010 |
| WO | 2018111173 A1 | 6/2018 |
| WO | 2018117207 A1 | 6/2018 |

OTHER PUBLICATIONS

International Search Report and Written Opinion dated Nov. 21, 2019 for International Application No. PCT/EP2019/076282 filed Sep. 27, 2019, consisting of 14-pages.

(Continued)

*Primary Examiner* — Abdullahi Ahmed
(74) *Attorney, Agent, or Firm* — Christopher & Weisberg, P.A.

(57) ABSTRACT

A method, network node and wireless device for position reference signal (PRS) design by extending a base signal are disclosed. According to one aspect, a method in a wireless device (WD) includes obtaining extended reference signal, RS, configurations from the network node. The method also includes determining a waveform associated with the extended RS. The method also includes detecting a RS and estimate an associated time of arrival. The method further includes sending a measurement report to the network node based on the estimated time of arrival.

14 Claims, 9 Drawing Sheets

(56) References Cited

U.S. PATENT DOCUMENTS

| | | |
|---|---|---|
| 2018/0198580 A1 | 6/2018 | Nammi et al. |
| 2019/0058515 A1* | 2/2019 | Harada ................ H04B 7/0626 |
| 2019/0394747 A1* | 12/2019 | Akkarakaran ...... H04W 56/001 |
| 2020/0022176 A1 | 1/2020 | Osawa et al. |
| 2021/0072340 A1* | 3/2021 | Wang .................... H04L 5/0051 |
| 2021/0083827 A1* | 3/2021 | Bao ....................... H04W 72/51 |
| 2021/0099965 A1* | 4/2021 | Manolakos ........... G01S 13/878 |
| 2021/0105579 A1* | 4/2021 | Akkarakaran .......... G01S 1/042 |
| 2022/0086787 A1* | 3/2022 | Ernström ............ H04L 25/0224 |

OTHER PUBLICATIONS

3GPP TS 38.331 V15.2.1; 3rd Generation Partnership Project; Technical Specification Group Radio Access Network; NR; Radio Resource Control (RRC) protocol specification (Release 15); Jun. 2018, consisting of 303-pages.

* cited by examiner

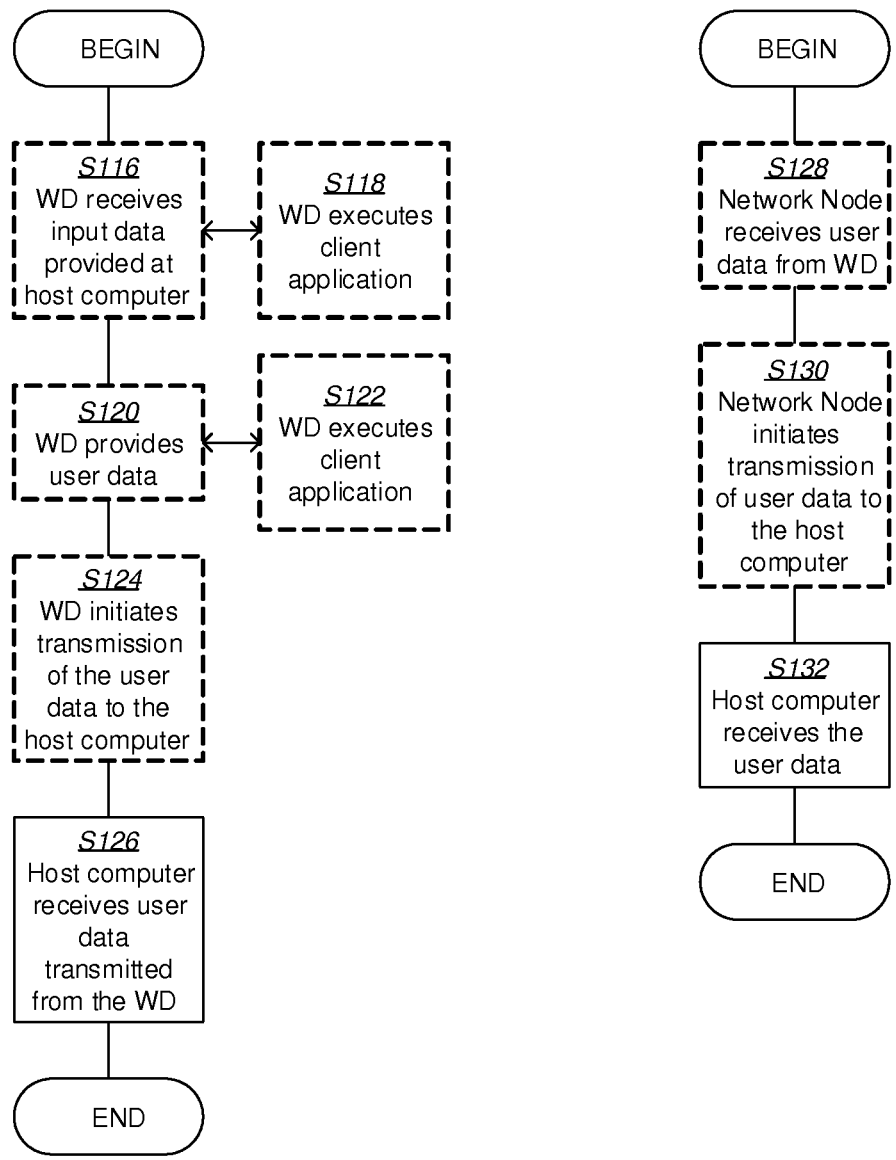

PRS DESIGN BY EXTENDING THE BASIC SIGNAL

CROSS-REFERENCE TO RELATED APPLICATIONS

This application is a Submission Under 35 U.S.C. § 371 for U.S. National Stage Patent Application of International Application No.: PCT/EP2019/076282, filed Sep. 27, 2019 entitled "NEW PRS DESIGN BY EXTENDING THE BASIC SIGNAL," which claims priority to U.S. Provisional Application No. 62/738,882, filed Sep. 28, 2018, the entireties of both of which are incorporated herein by reference.

FIELD

The present disclosure relates to wireless communications, and in particular, to position reference signals (PRS) design by extending a base signal.

INTRODUCTION

Positioning has been a topic in Long Term Evolution (LTE) standardization since the Third Generation Partnership Project (3GPP) Release 9. The primary objective is to fulfill regulatory requirements for emergency call positioning. Positioning in New Radio (NR) is proposed to be supported by the architecture shown in FIG. 1. The Location Management Function (LMF) is the location server in NR. There are also interactions between the location server and the gNodeB via the New Radio Positioning Protocol A (NRPPa). The interactions between the gNodeB and the device is supported via the Radio Resource Control (RRC) protocol.

In the legacy LTE standards, the following techniques are supported:

Enhanced Cell ID. Essentially cell ID information to associate the device to the serving area of a serving cell, and then additional information to determine a finer granularity position;

Assisted GNSS. Global Navigational Satellite System (GNSS) information retrieved by the wireless device (WD), supported by assistance information provided to the WD from the evolved serving mobile location center (E-SMLC);

OTDOA (Observed Time Difference of Arrival). The device estimates the time difference of reference signals from different base stations and sends to the E-service mobile location center (E-SMLC) for multilateration;

UTDOA (Uplink TDOA). The device is requested to transmit a specific waveform that is detected by multiple location measurement units (e.g., a network node such as an eNB) at known positions. These measurements are forwarded to E-SMLC for multilateration.

According to the NR positioning study item agreed for 3GPP Rel.16, the 3GPP NR radio-technology is positioned to provide added value in terms of enhanced location capabilities. The operation in low and high frequency bands (i.e., below and above 6 GHz) and utilization of massive antenna arrays provide additional degrees of freedom to substantially improve the positioning accuracy as compared with older technologies. The possibility to use wide signal bandwidth in low and especially in high bands brings new performance bounds for user location for well-known positioning techniques based OTDOA and UTDOA, Cell-ID or E-Cell-ID etc., utilizing timing measurements to locate the wireless device (WD). The recent advances in massive antenna systems (massive multiple input multiple output (MIMO)) can provide additional degrees of freedom to enable more accurate user location by exploiting spatial and angular domains of propagation channel in combination with time measurements.

Both MC (multi-carrier) and SC (single-carrier) waveforms have been proposed for the 5G air-interface. The MC candidates include Cyclic-Prefix (CP)-OFDM, Windowed (W)-OFDM, Pulse-shaped (P)-OFDM, Unique-Word (UW)-OFDM, Universal-Filtered (UF)-OFDM, and Filter-Bank Multi-Carrier (FBMC) with Offset Quadrature Amplitude Modulation (OQAM), while the SC candidates include DFT-spread (Discrete Fourier Transform-s)-OFDM, and Zero-Tail (ZT)-DFT-s-OFDM. Due to its desirable features, the CP-OFDM waveform is currently used in LTE for downlink transmissions. These features include: robustness to frequency selective channel, easy integration with MIMO, very good time localization, and a low complexity baseband transceiver design. The main drawbacks of OFDM are high PAPR and poor localization in frequency. The embodiments within this disclosure is not limited to the exemplary waveforms listed above. Other waveforms may also be included in the embodiments.

With 3GPP Release 9, Positioning Reference Signals (PRS) were introduced for antenna port 6 as the 3GPP Release 8 cell-specific reference signals (CRS) are not sufficient for positioning. A reason is that the required high probability of detection could not be guaranteed. A neighbor cell with its synchronization signals (Primary-/Secondary Synchronization Signals) and reference signals are seen as detectable, when the Signal-to-Interference-and-Noise Ratio (SINR) is at least −6 dB. Simulations during standardization have shown, that this can be only guaranteed for 70% of all cases for the 3rd best-detected cell, means 2nd best neighboring cell. This is not enough and has been assumed an interference-free environment, which cannot be ensured in a real-world scenario. However, PRS have still some similarities with cell-specific reference signals as defined in 3GPP Release 8. It is a pseudo-random quadrature phase shift keyed (QPSK) sequence that is being mapped in diagonal patterns with shifts in frequency and time to avoid collision with cell-specific reference signals and an overlap with the control channels such as the physical downlink control channel (PDCCH).

The LTE standard PRS provides three layers of isolation to improve hearability (i.e., the ability to detect weak neighbour cells):

Code domain: Each cell transmits a different PRS sequence (orthogonal to other PRS sequences in the code domain).

Frequency domain: PRS has a frequency re-use of six, i.e., six possible frequency arrangements (called frequency offset) are defined within the PRS bandwidth. If two cells have the same frequency offset, the PRSs collide in the frequency domain. In such cases, the isolation from the orthogonal PRS sequences distinguishes one cell from the other.

Time domain: If PRSs collide in the frequency domain, muting (time-based blanking) can make the PRS occasions again appear orthogonal to each other.

In NR, the channel state information reference signal (CSI RS) for tracking (also referred to as the tracking reference signal (TRS)) comes in periodic bursts having one or two slots (FIG. 2). Both burst periodicity and slot offset is configurable through the radio resource control (RRC) parameter CSI-ResourcePeriodicityAndOffset.

In the time domain two symbols that are four symbols apart are used in each slot of the TRS burst At low frequencies, three different symbol pair positions are allowed, giving three orthogonal patterns in time. At high frequencies, all symbol positions are allowed. This allows for a maximum of six different symbol pair positions. In practice, this is often limited further to a maximum of five symbol positions in order to avoid overlap with control resource sets (CORESETS).

In the frequency domain, the TRS has a comb 4 structure. That means that frequency shifts give four orthogonal patterns in the frequency domain. In total that gives 4*3=12 orthogonal patterns (FIG. 3). At high frequencies all time shifts are allowed which in principle should allow six TRSs in a slot, but since the first slot is used for control it is typically only possible to squeeze in five TRSs (depends on bandwidths and core set positions).

While exploring a positioning solution for NR for the first time, the existing OTDOA method in LTE requires a downlink reference signal:

Positioning reference signals (PRS) which are the main OTDOA's reference signal used in an LTE network are not available in NR standalone.

In principle, RSTD measurements for NR OTDOA can be based on any existing 3GPP Rel-15 NR DL signals including synchronization signal. The CSI-RS and TRS are potentially the best available options in the current available downlink reference signals.

These signals however have not been designed for positioning purpose and thus each has one or more disadvantages in terms of:

orthogonality;
configuration inflexibility;
interference;
lack of synergy with legacy LTE PRS; and
cell/beam identification.

SUMMARY

Some embodiments advantageously provide methods, systems, and apparatuses for position reference signals (PRS) design by extending a base signal.

According to one aspect, a network node is provided. The network node configured to act as a transmission point and configured to communicate with a wireless device (WD). The network node includes a radio interface and a processing circuitry configured to obtain extended reference signal (RS) configurations from another network node. The radio interface and the processing circuitry are further configured to determine an extended RS waveform based on the extended RS configuration and to transmit the extended RS waveform to the WD.

According to another aspect, a method implemented in a network node is provided. The network node acts as a transmission point and is configured to communicate with a wireless device (WD). The method includes obtaining extended reference signal (RS) configurations from another network node. The method further includes determining an extended RS waveform based on the extended RS configuration. Furthermore, the method includes transmitting the extended RS waveform to the WD.

According to another aspect, a wireless device, WD, is the provided. The WD is configured to communicate with a network node, the WD includes a radio interface and a processing circuitry configured to obtain extended reference signal, RS, configurations from the network node. The radio interface and a processing circuitry are further configured to determine a waveform associated with the extended RS and to detect a RS and estimate an associated time of arrival. Furthermore, the radio interface and the processing circuitry are configured to send a measurement report to the network node based on the estimated time of arrival.

According to another aspect, a method implemented in a wireless device, WD, is provided. The WD is configured to communicate with a network node. The method includes obtaining extended reference signal, RS, configurations from the network node. The method further includes determining a waveform associated with the extended RS. Furthermore, the method includes detecting a RS and estimate an associated time of arrival. Finally, the method includes sending a measurement report to the network node based on the estimated time of arrival.

To enable efficient and flexible downlink (DL) based positioning for NR, an enhancement and extension of the available NR signals seems to be necessary especially considering the demanding requirements of NR positioning use-cases. By way of brief summary, the following is an example procedure:

Step 100 A transmission point (TP) obtains extended RS configurations from a network node;

Step 110 The TP provides the extended+RS configuration to the location server;

Step 120 The TP determines the new waveform based on the extended RS configuration;

Step 130 The TP transmits the extended RS waveform;

Step 200 A device obtains extended RS configurations from a network node;

Step 210 The device determines the waveform associated to the extended RS;

Step 220 The device detects a RS and estimates the associated time of arrival; and Step 230 The device sends a measurement report to a network node based on the estimated time of arrival (TOA)

The basic steps 100-130 above are from a transmission point perspective, where a transmission point optionally receives (100) a configuration from a network node (e.g. the OAM system) of an extended RS configuration as detailed in the embodiments of this disclosure. The transmission point may also optionally send (110) the extended+the original reference signal configuration to a network node such as the location server. The transmission point determines (120) the associated reference signal waveform based on the received extension configuration and transmits (130) the extended reference signal.

The basic steps 200-230 above are from a device perspective, where the device optionally and based on its capability obtains (or retrieves from a pre-configuration) (200) an extended RS configuration as detailed in the embodiments of this disclosure. The device may as a separate step determine (210) the waveform of the associated extended RS. The device either detects the original RS or the extended RS and estimates its time of arrival (TOA) (220). Then, the device sends a measurement report to a network node (e.g., the location server or a base station) based on the estimated TOA (230).

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 8 is a flow chart illustrating exemplary methods implemented in a communication system including a host computer, a network node and a wireless device for receiving user data from the wireless device at a host computer according to some embodiments of the present disclosure;

FIG. 9 is a flow chart illustrating exemplary methods implemented in a communication system including a host computer, a network node and a wireless device for receiving user data at a host computer according to some embodiments of the present disclosure;

DETAILED DESCRIPTION

Figure 1:
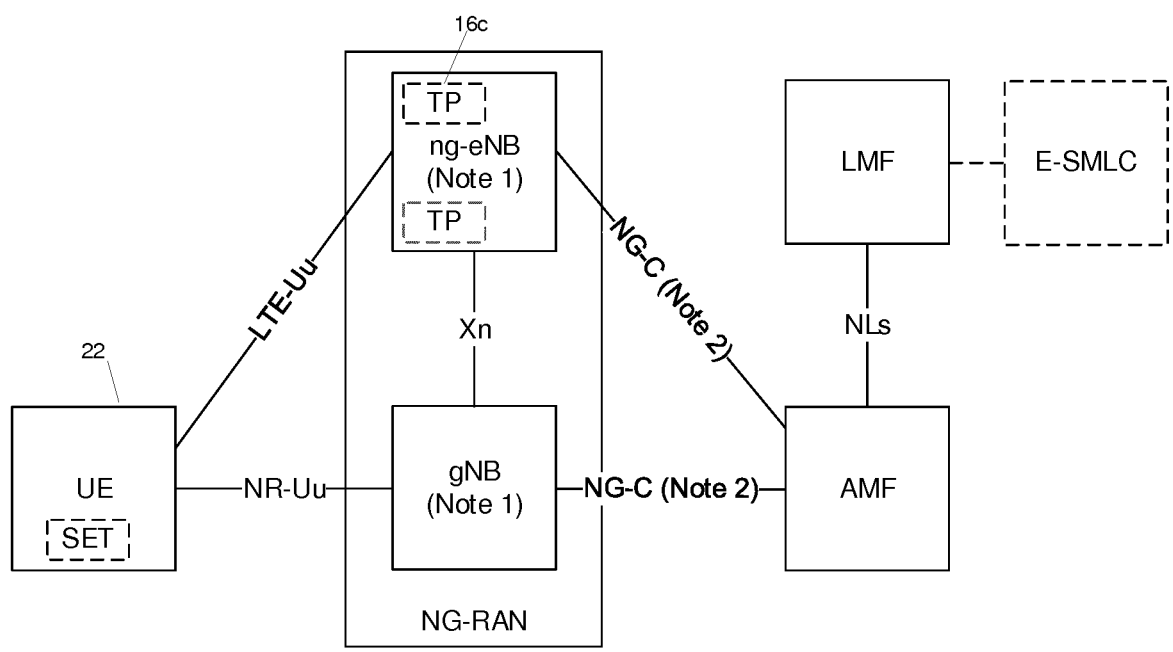
FIG. 1 is an example architecture for positioning in New Radio.

Before describing in detail exemplary embodiments, it is noted that the embodiments reside primarily in combinations of apparatus components and processing steps related to position reference signals (PRS) design by extending a base signal. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some advantages of some embodiments described herein include:

Reusing the base signals (CSI-RS+synch/TRS) which are available in NR as much as possible for positioning purpose;

Potentially more feasible solution in respect to lean NR design and introducing a new reference signal to be broadcasted from the network nodes, e.g., gNBs;

Extension of the signals by additional symbols;

The WDs depending on their capabilities can be either configured to monitor the TRS part of the signal unaware of the extension, or to be configured to monitor the PRS=TRS+extensions for TOA estimation; and Backwards-compatibility, so that simple WDs could have some basic (simple) positioning using only CSI-RS/TRS, but more advanced WDs, requiring higher accuracy, could also process the PRS and have better accuracy.

Some embodiments involve configuring existing NR reference signals and NR data transmissions to allow for accurate measurements for positioning such as TOA and reference signal time difference (RSTD), and to configure WDs to perform such measurements.

Some embodiments involve configuring supplementation existing NR reference signals with additional signals that can be used by the WD in combination with the existing NR reference signals to achieve more accurate measurements for positioning such as TOA and RSTD, and to configure WDs to perform such measurements.

Figure 4:
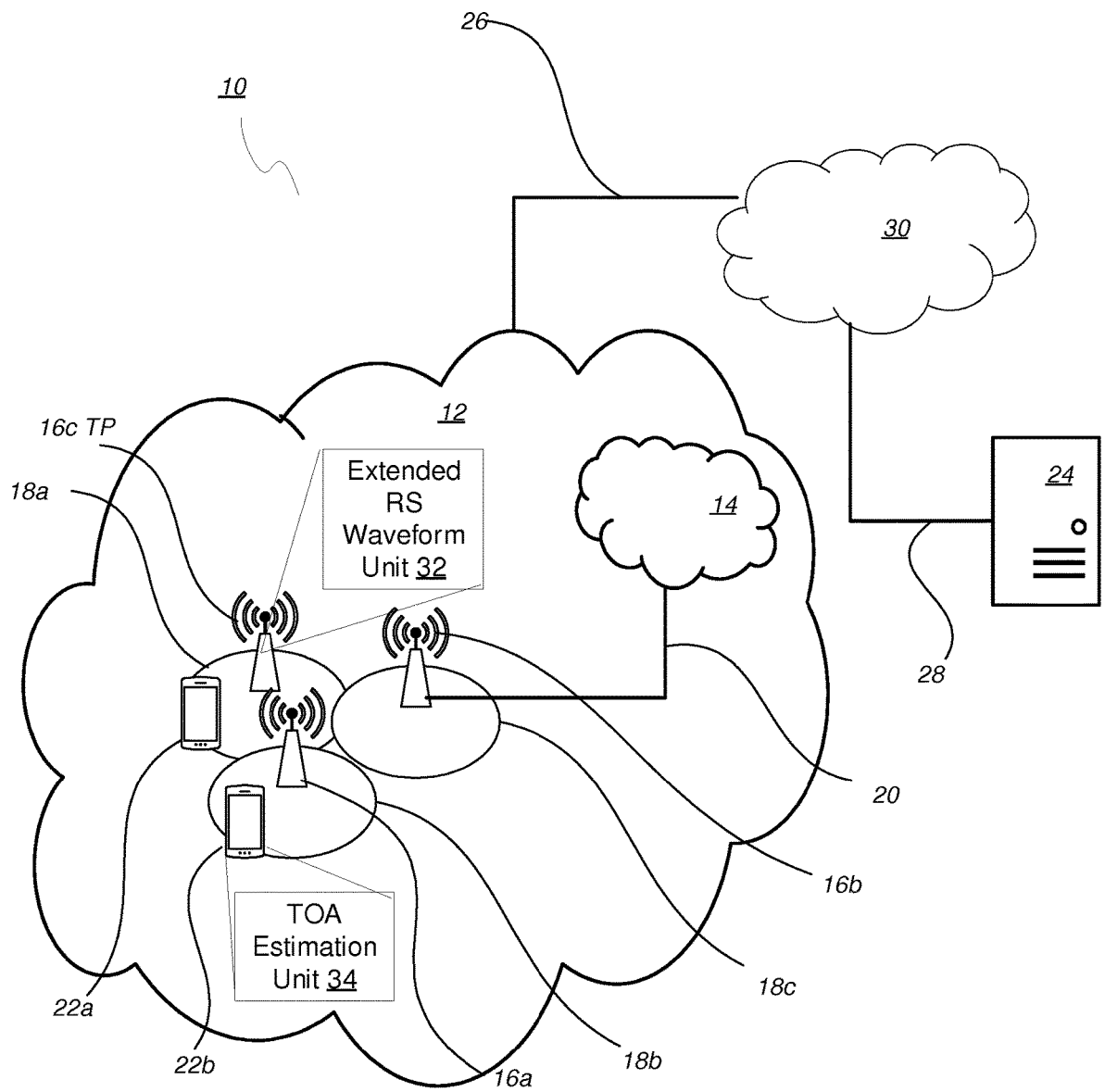
FIG. 4 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 4 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 4 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

The network node is configured to act as transmission point (TP). The transmission point may include an antenna which may be a Multiple-Input Multiple-Output (MIMO) antenna including two or more antennas. The UE is thereby, via network node and the transmission point, enabled to access services of, and exchange data with service network.

A network node 16 is configured to include an extended RS waveform unit 32 which is configured to determine an extended RS waveform based on an extended RS configuration. A wireless device 22 is configured to include a TOA estimation unit 34 which is configured to detect a RS and estimate an associated time of arrival.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16.

The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include an extended RS waveform unit 32 configured to determine an extended RS waveform based on an extended RS configuration.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a TOA estimation unit 34 configured to detect a RS and estimate an associated time of arrival.

Figure 2:
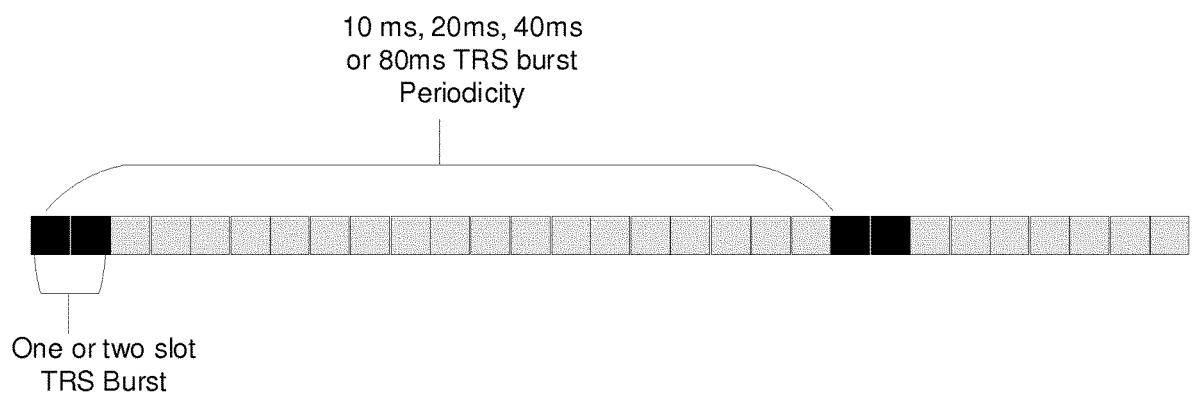
FIG. 2 is a diagram of periodic bursts in one or two slots.
Figure 3:
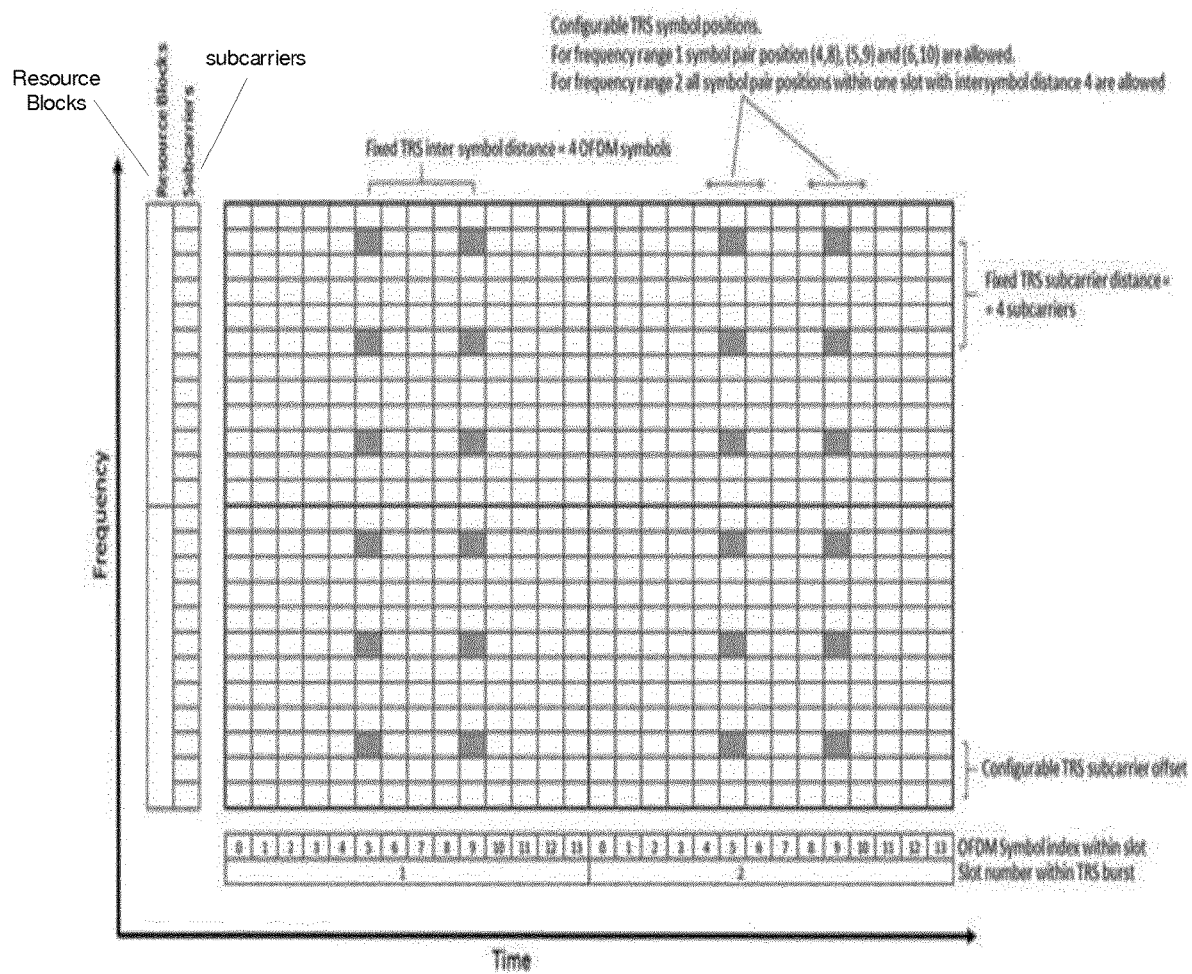
FIG. 3 is a design in frequency and time of a TRS.

In some embodiments, the inner workings of the network node 16, WD 22, and host computer 24 may be as shown in FIG. 2 and independently, the surrounding network topology may be that of FIG. 4.

Figure 5:
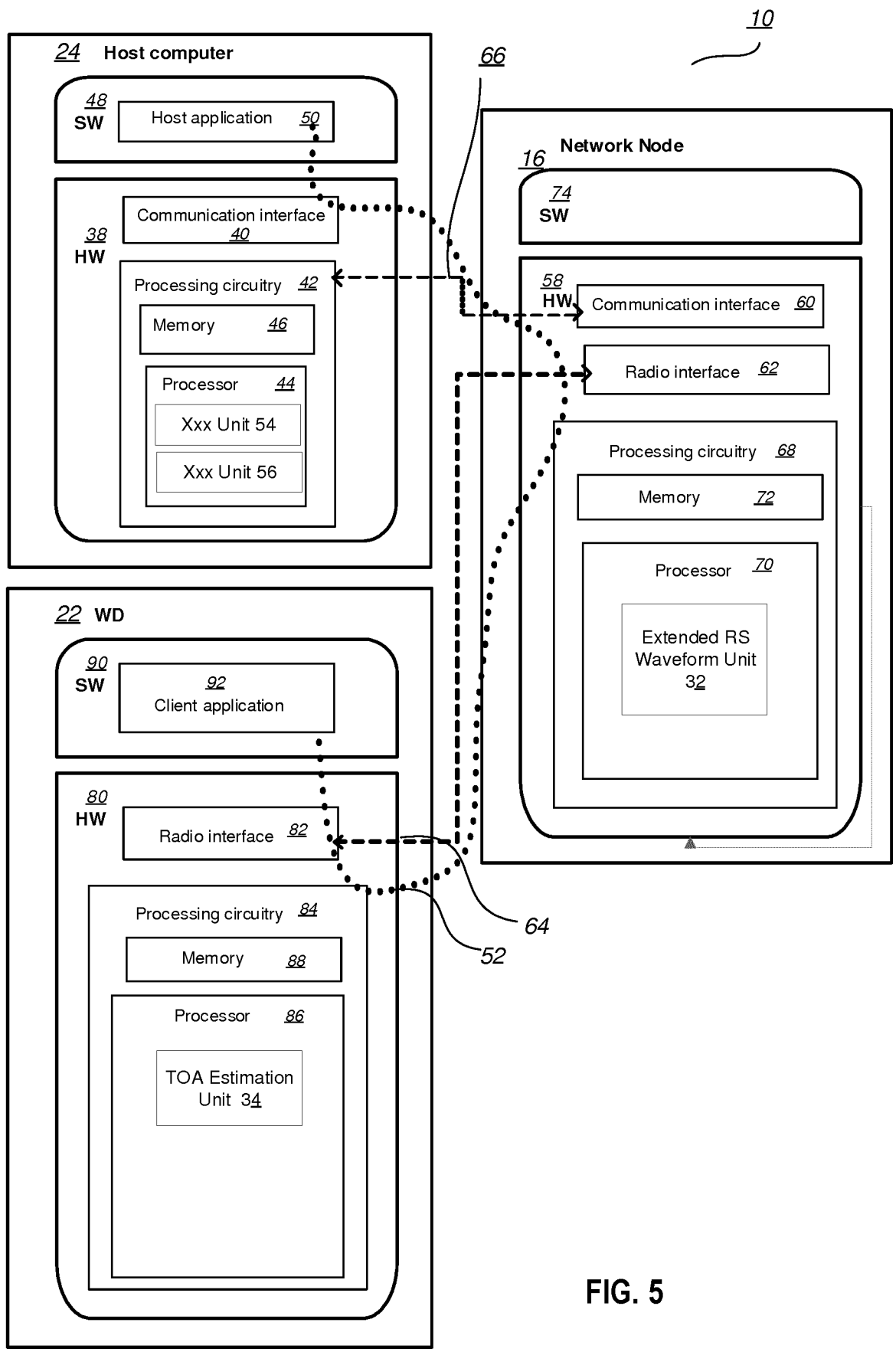
FIG. 5 is a block diagram of a host computer communicating via a network node with a wireless device over an at least partially wireless connection according to some embodiments of the present disclosure.

In FIG. 5, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 4 and 5 show various "units" such as extended RS waveform unit 32, and TOA estimation unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 6, 7:
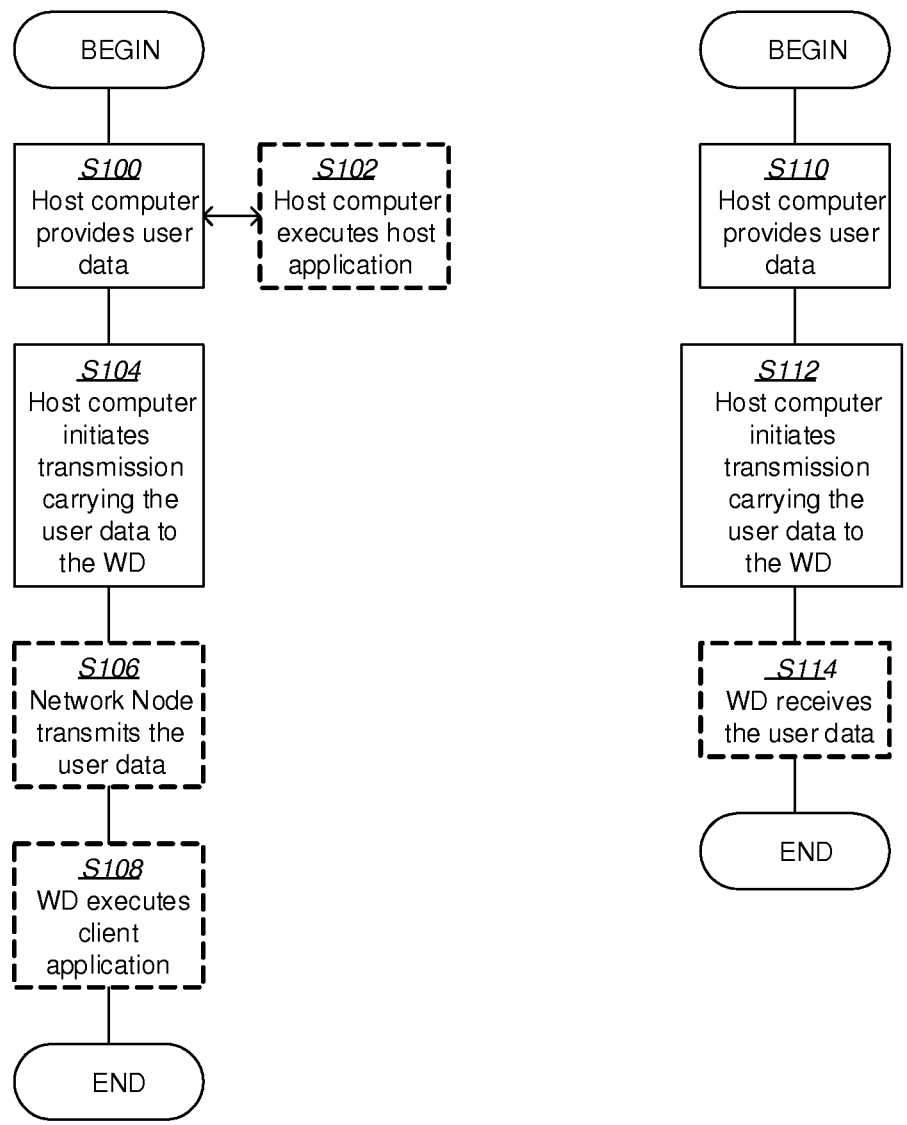
FIG. 6 is a flow chart illustrating exemplary methods implemented in a communication system including a host computer, a network node and a wireless device for executing a client application at a wireless device according to some embodiments of the present disclosure.
FIG. 7 is a flow chart illustrating exemplary methods implemented in a communication system including a host computer, a network node and a wireless device for receiving user data at a wireless device according to some embodiments of the present disclosure.

FIG. 6 is a flowchart illustrating an exemplary method implemented in a communication system, such as, for example, the communication system of FIGS. 4 and 5, in accordance with one embodiment. The communication system may include a host computer 24, a network node 16 and a WD 22, which may be those described with reference to FIG. 5. In a first step of the method, the host computer 24 provides user data (block S100). In an optional substep of the first step, the host computer 24 provides the user data by executing a host application, such as, for example, the host application 74 (block S102). In a second step, the host computer 24 initiates a transmission carrying the user data to the WD 22 (block S104). In an optional third step, the network node 16 transmits to the WD 22 the user data which was carried in the transmission that the host computer 24 initiated, in accordance with the teachings of the embodiments described throughout this disclosure (block S106). In an optional fourth step, the WD 22 executes a client application, such as, for example, the client application 114, associated with the host application 74 executed by the host computer 24 (block S108).

FIG. 7 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In a first step of the method, the host computer 24 provides user data (block S110). In an optional substep (not shown) the host computer 24 provides the user data by executing a host application, such as, for example, the host application 74. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

FIG. 8 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, the WD 22 receives input data provided by the host computer 24 (block S116). In an optional substep of the first step, the WD 22 executes the client application 114, which provides the user data in reaction to the received input data provided by the host computer 24 (block S118). Additionally or alternatively, in an optional second step, the WD 22 provides user data (block S120). In an optional substep of the second step, the WD provides the user data by executing a client application, such as, for example, client application 114 (block S122). In providing the user data, the executed client application 114 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

FIG. 9 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130). In a third step, the host computer 24 receives the user data carried in the transmission initiated by the network node 16 (block S132).

Figure 10:
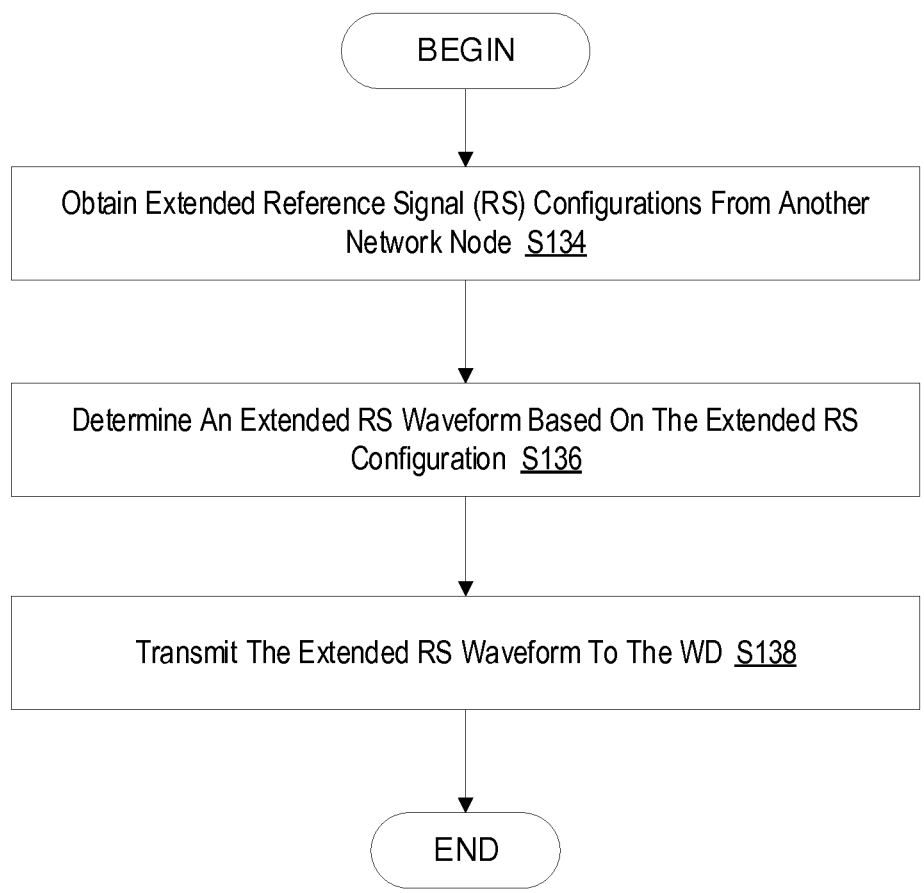
FIG. 10 is a flowchart of an exemplary process in a network node according to some embodiments of the present disclosure.

FIG. 10 is a flowchart of an exemplary process in a network node 16 according to some embodiments of the present disclosure. The process includes obtaining, via the processor 70, extended reference signal (RS) configurations from another network node 16 (block S134). The process also includes determining, via the extended RS waveform unit 32, an extended RS waveform based on the extended RS configuration (block S136). The process also includes transmitting, via the radio interface 62, the extended RS waveform to the WD 22 (block S138).

According to this aspect, in some embodiments, the processing circuitry 68 is further configured to provide an extended RS configuration to a location server. In some embodiments, one RS per cell for time and frequency tracking purposes is transmitted, via the radio interface 62. In some embodiments, one two slot RS per cell with a burst periodicity for time and frequency tracking purposes is transmitted, via the radio interface 62.

Figure 11:
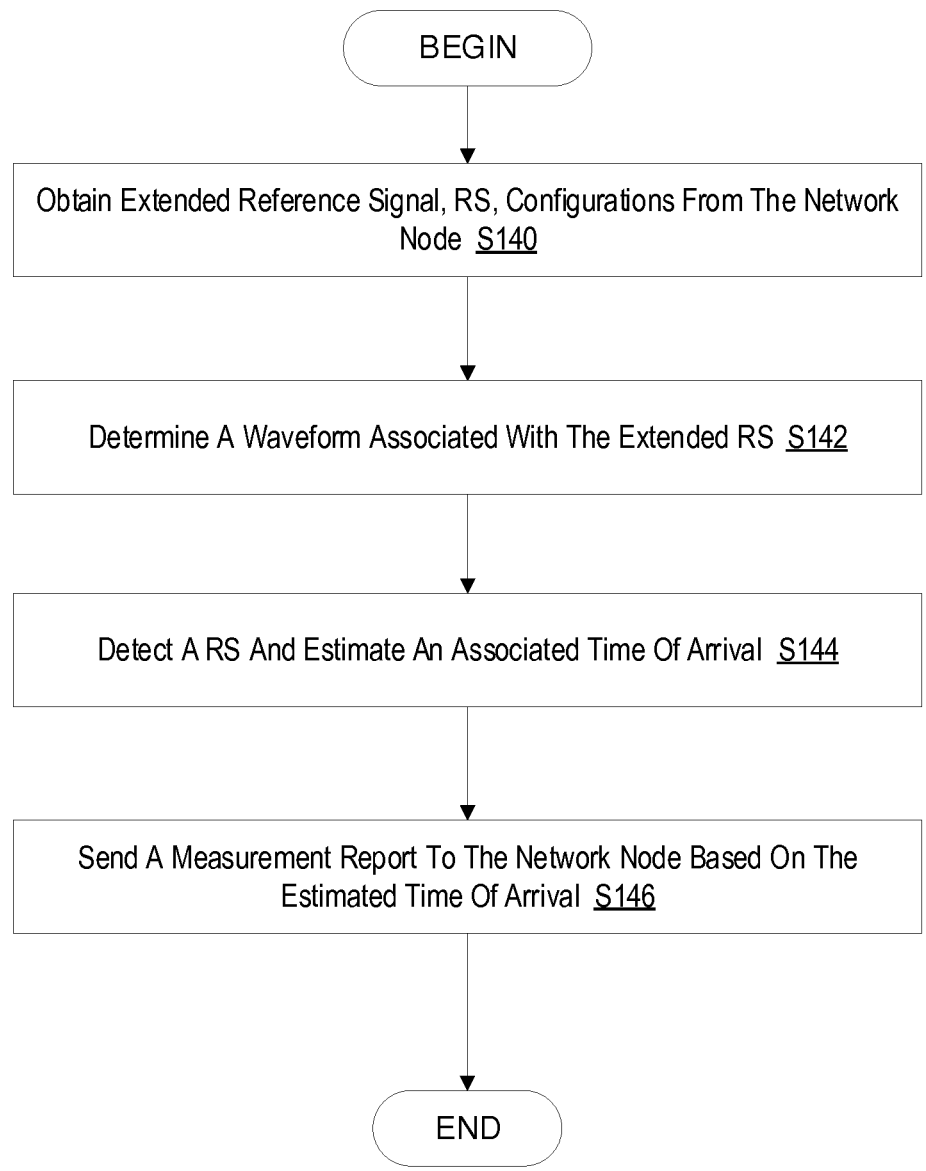
FIG. 11 is a flowchart of an exemplary process in a wireless device for according to some embodiments of the present disclosure.

FIG. 11 is a flowchart of an exemplary process in a wireless device 22 according to some embodiments of the present disclosure. The process includes obtaining, via the processor 86, extended reference signal, RS, configurations from the network node 16 (block S140). The process also includes determining, via the processor 86, a waveform associated with the extended RS (block S142). The process also includes detecting, via the TOA estimation unit 34, an RS and estimate an associated time of arrival (block S144). The process further includes sending, via the radio interface 82, a measurement report to the network node 16 based on the estimated time of arrival (block S146). According to this aspect, in some embodiments, the WD 22 obtains a preconfigured extended RS.

Having described the general process flow of arrangements of the disclosure and having provided examples of hardware and software arrangements for implementing the processes and functions of the disclosure, the sections below provide details and examples of arrangements for position reference signals (PRS) design by extending a base signal.

In the TRS based embodiments the TRS signal transmitted for frequency and time tracking purposes is utilized by the WD also for positioning measurements such as, e.g., TOA and RSTD.

In one embodiment the WD is configured to utilize all TRS burst occurrences for positioning measurements.

In another embodiment the WD is configured to utilize a subset of the TRS burst occurrences for positioning measurements, as given, e.g., by a periodicity which is a multiple of the TRS burst periodicity.

In one group of embodiments the TRS is configured to improve the accuracy and coverage for the TRS based positioning measurements through a combination of one or more of the following configuration options:
Configure the TRS with different subcarrier offset for the TRS comb structure in different cells;
Configure the TRS with different symbol pair positions in different cells;
Configure the TRS with different slot offset in different cells; and
Configure the TRS to utilize non-overlapping sets of PRBs in different cells by appropriate configuration of the startPRB and nrofPRS IEs for the TRS.

a) Note that the number of TRSs with non-overlapping sets of PRBs that can be configured is limited by the total bandwidth and the bandwidth of the TRS.

In one embodiment, downlink data is not scheduled and not transmitted in slots in which a TRS to be used for positioning is transmitted in own cell or in another cell which is close enough to be impacted by interference from the data transmission.

In another embodiment, downlink data is not transmitted in symbols in which a TRS to be used for positioning is transmitted in own cell or in another cell which is close enough to be impacted by interference from the data transmission.

In one mode of the above embodiment, a WD is scheduled with downlink data in a slot in which a TRS to be used for positioning is transmitted in own cell or in another cell which is close enough to be impacted by interference from the data transmission. The WD is, however, configured to rate match around symbols in which a TRS to be used for positioning is transmitted in own cell or in another cell which is close enough to be impacted by interference from the data transmission. In one group of embodiments this is accomplished by configuring either a RateMatchPattern in the PDSCH configuration (PDSCH-Config) or in the serving cell configuration (ServingCellConfigCommon) or by configuring multiple ZP-CSI resources covering the symbol.

In one embodiment, an additional positioning reference signal (APRS) is transmitted and the WD is configured to utilize the TRS and the new signal in combination for improved positioning measurements.

In one embodiment, the APRS is transmitted in the same slot/slots as the TRS bursts. In another embodiment, the APRS is transmitted neighboring slots to the TRS burst.

In one embodiment, the APRS is a TRS. In one mode of this embodiment, the additional TRS has the same periodicity as the original TRS. In another mode of this embodiment, the additional TRS has a periodicity which is a multiple of that of the base TRS. In one mode of this embodiment the additional TRS has the same subcarrier offset as the base TRS it is supplementing.

In one embodiment the APRS has the same periodic burst structure as a TRS and the APRS burst has the same comb 4 subcarrier pattern and subcarrier offset configuration as the TRS burst but the APRS bursts have a different pattern in time compared to the TRS burst. In one mode of this embodiment the APRS can flexibly occupy any subset of the symbols within the slots of an APRS burst.

In one embodiment the APRS is configured to utilize orthogonal resource elements in frequency and/or time in cells that interfere strongly with each other, e.g. neighboring cells.

In one embodiment downlink data is not scheduled and not transmitted in slots in which an APRS is transmitted in an own cell or in another cell which is close enough to be impacted by interference from the data transmission In another embodiment downlink data is not transmitted in symbols in which an APRS is transmitted in an own cell or in another cell which is close enough to be impacted by interference from the data transmission.

In one mode of the above embodiments, a WD is scheduled with downlink data in a slot in which an APRS is transmitted in an own cell or in another cell which is close enough to be impacted by interference from the data transmission. The WD is, however, configured to rate match around symbols in which an APRS is transmitted in an own cell or in another cell which is close enough to be impacted by interference from the data transmission. In one group of embodiments this is accomplished by configuring either a RateMatchPattern in the PDSCH configuration (PDSCH-Config) or in the serving cell configuration (ServingCellConfigCommon) or by configuring multiple ZP-CSI resources covering the symbol.

EXAMPLE EMBODIMENTS

In the subsections below provide and describe a number of more detailed example embodiments.

Embodiment A (One TRS Per Cell)

Transmit one TRS per cell for time and frequency tracking purposes.
Configure the TRS with the same TRS burst slot offset in all cells.
Configure the TRS with the same symbol position in all cells.
Configure the TRS with different subcarrier offsets in different cells. The same subcarrier offset is reused in every fourth cell.
Configure WDs to rate match around the TRS symbols (which are the same in all cells) using a rate match patter in the PDSCH configuration (RRC RateMatchPattern IE in RRC PDSCH-Config IE).
Don't transmit any downlink data or other downlink signals in the same symbol as the TRS.
Power boost the TRS to utilize the full power of the transmission point.
Configure the WDs to perform and report positioning measurements such as TOA and RSTD based on a number of TRSs transmitted from different cells.

Embodiment B (One Base TRS Per Cell Augmented with Additional TRS with Lower Periodicity)

Transmit one two slot TRS per cell with a TRS burst periodicity of 20 ms for time and frequency tracking purposes.
Configure the TRS with the same TRS burst slot offset in all cells.
Configure the TRS with the same symbol position in all cells.
Configure the TRS with different subcarrier offsets in different cells. The same subcarrier offset is reused in every fourth cell.
Transmit an additional two slot TRS with a burst periodicity of 80 ms in each cell for positioning purposes
a) The additional TRS has the same slot offset and subcarrier offset as the TRS in the same cell but has different symbol positions.
Configure WDs to rate match around both the symbols carrying the basic TRS intended for tracking and the symbols carrying additional TRS symbols using a rate match patter (RRC RateMatchPattern IE in the PDSCH configuration (RRC PDSCH-Config IE).
Don't transmit any downlink data or other downlink signals in the same symbol as the basic TRS and additional TRS.
Power boost the TRSs to utilize the full power of the transmission point.
Configure the WDs to perform and report positioning measurements such as TOA and RSTD based on a combination of the basic TRS and the additional TRS.

a) The WD is configured to utilize only every fourth TRS burst of the basic TRS, which is coinciding with a burst of the additional TRS which comes with a longer periodicity.

Embodiment C (12 Beamformed TRSs)

Transmit twelve beamformed TRS's per cell for time and frequency tracking purposes with a periodicity of 20 ms.

Divide the twelve TRS's in three groups with four TRSs in each group.
a) Use a different slot offset for each of the three groups of TRS's.
b) Use different symbol positions within the slot for each of the four TRS's within a group.
Utilize the same slot offsets and the same symbol positions to configure the twelve TRSs in all cells.
Configure the TRS with different subcarrier offsets in different cells. The same subcarrier offset is reused in every fourth cell.
Configure WDs to rate match around the TRS symbols (which are the same in all cells) using a rate match patter in the PDSCH configuration (RRC RateMatch-Pattern IE in RRC PDSCH-Config IE).
Don't transmit any downlink data or other downlink signals in the same symbol as the TRS.
Power boost the TRS to utilize the full power of the transmission point.
Configure the WDs 22 to perform and report positioning measurements such as TOA and RSTD based on a number of TRSs transmitted from different cells.

Embodiment C1 (12 Beamformed TRSs Augmented with 12 Additional Beamformed Signals)

Transmit twelve beamformed one slot TRS's per cell for time and frequency tracking purposes with a periodicity of 20 ms.
Divide the twelve TRS's in three groups with four TRSs in each group.
a) Use a different slot offset for each of the three groups of TRS's.
b) Use different symbol positions within the slot for each of the four TRS's within a group. See Table 1 for a one embodiment.
Utilize the same slot offsets and the same symbol positions to configure the twelve TRSs in all cells.
Configure the TRS with different subcarrier offsets in different cells. The same subcarrier offset is reused in every fourth cell.
Transmit twelve additional positioning reference signals (APRS) beamformed as the twelve TRSs and configure the WDs 22 to utilize the APRSs together with the correspondingly beamformed TRSs with 80 ms periodicity.
a) The APRS has the same comb structure and subcarrier offset as the corresponding TRS.
b) Each APRS utilizes one symbol in the same slot as the corresponding TRS. See Table 1 below for an example embodiment for the symbol positions within the slot.

Don't schedule or transmit any downlink data or other downlink signals in the same slots as the TRS and the APRS.
Power boost the TRS and the APRS to utilize the full power of the transmission point.
Configure the WDs 22 to perform and report positioning measurements such as TOA and RSTD based on a number of TRSs and APRSs transmitted from different cells.

TABLE 1

| TRS1 | TRS2 | TRS3 | TRS4 | TRS1 | TRS2 | TRS3 | TRS4 | PRS1 | PRS2 | PRS3 | PRS4 |
| --- | --- | --- | --- | --- | --- | --- | --- | --- | --- | --- | --- |

The extension of additional symbols can be in the time domain, the code domain or in the frequency domain or the combination of them.

In one embodiment the measurement is performed by correlating the received signal with both the base signal and the additional signal and a combined correlation is formed by adding the two correlations together with different weight and with a time offset given by the corresponding time offset between the two transmitted signals. In one mode of this embodiment the weights are defined by the maximum-ratio combining (MRC) criteria.

In another embodiment, the device estimates TOA separately using the base signal and the additional signal, and combine the estimated TOA into one TOA per set of base and additional signal. In one mode, the combination comprises selecting the first TOA of the TOAs of base and additional signals.

In yet another embodiment, where the device is configured with both a base and additional signals, but where the time of arrival estimation requirements or time synchronization requirements is concluded to be satisfied by only considering the base signal, then the device may refrain from considering the additional signal.

In one embodiment, the devices depending on their capabilities can be either configured to monitor the base part of the signal unaware of the extension, or in another embodiment they can be configured to monitor the combined bae and additional signal The configuration of a WD 22 to use a base signal together with an additional signal for positioning could be done in one of the two following ways:
Configure the WD 22 with a reference symbol describing the combination of the base signal and the additional signal.
Configure the WD 22 separately with the base signal and the additional signal plus a connection e.g. using a RS id to connect the two.

The configuration could be done using NR RRC or over a new protocol between the WD 22 and a position entity in the network, called e.g. NPP (NR Positioning Protocol)

In one embodiment downlink data is not scheduled and not transmitted in slots in which a base signal or additional signal is transmitted in own cell or in another cell which is close enough to be impacted by interference from the data transmission In another embodiment downlink data is not transmitted in symbols in which a base signal or additional signal is transmitted in own cell or in another cell which is close enough to be impacted by interference from the data transmission.

In one mode of the above embodiment a WD 22 is scheduled with downlink data in a slot in which a base signal or additional signal is transmitted in own cell or in another cell which is close enough to be impacted by interference from the data transmission. The WD 22 is, however, configured to rate match around symbols in which a base signal or additional signal is transmitted in own cell or in another cell which is close enough to be impacted by interference from the data transmission. In one group of embodiments this is accomplished by configuring either a RateMatchPattern in the physical downlink shared channel (PDSCH) configuration (PDSCH-Config) or in the serving cell configuration (ServingCellConfigCommon) or by configuring multiple ZP-CSI resources covering the symbol.

In one embodiment the RateMatchPattern information element (IE} is extended to allow for longer periodicities.

In one mode of the above embodiment an additional periodicity IE is added to the RateMatchPattern IE in addition to the IE periodicityAndPattern separating the periodicity from the pattern (see extract from 3GPP TS 38.331 V15.2.1 (2018 June) below).

ASN1STOP 1.1.1.1—RateMatchPattern

The IE RateMatchPattern can be used to configure one rate matching pattern for PDSCH. In one example this corresponds to L1 IE 'rate-match-PDSCH-resource-set', see, for example, 3GPP Technical Standard (TS) 38.214, section FFS_Section.

RateMatchPattern Information Element

```
-- ASN1START
-- TAG-RATEMATCHPATTERN-START
RateMatchPattern ::=         SEQUENCE {
  rateMatchPatternId         RateMatchPatternId,
  patternType                CHOICE {
    bitmaps                  SEQUENCE {
      resourceBlocks              BIT STRING (SIZE (275)),
      symbolsInResourceBlock      CHOICE {
        oneSlot                     BIT STRING (SIZE (14)),
        twoSlots                    BIT STRING (SIZE (28))
      },
      periodicityAndPattern       CHOICE {
        n2                          BIT STRING (SIZE (2)),
        n4                          BIT STRING (SIZE (4)),
        n5                          BIT STRING (SIZE (5)),
        n8                          BIT STRING (SIZE (8)),
        n10                         BIT STRING (SIZE (10)),
        n20                         BIT STRING (SIZE (20)),
        n40                         BIT STRING (SIZE (40))
      }
        OPTIONAL,    -- Need S
      ...
    },
    controlResourceSet         ControlResourceSetId
  },
  subcarrierSpacing          SubcarrierSpacing
  OPTIONAL,         -- Cond CellLevel
  mode                       ENUMERATED { dynamic, semiStatic },
  ...
}
-- TAG-RATEMATCHPATTERN-STOP
-- ASN1STOP
```

It is noted that extending the available TRS signal for positioning purposes may be an efficient solution in terms of a downlink positioning method in NR.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
NR New Radio
OTDOA Observed Time Difference of Arrival
PDP Power Delay Profile
LOS Line of Sight
NLOS Non-Line of Sight
TDOA Time Difference of Arrival
TRS Tracking Reference Signal It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

EMBODIMENTS

Embodiment A1. A network node acting as a transmission point and configured to communicate with a wireless device (WD), the network node configured to, and/or comprising a radio interface and/or comprising processing circuitry configured to:
obtain extended reference signal (RS) configurations from another network node;
determine an extended RS waveform based on the extended RS configuration; and
transmit the extended RS waveform to the WD.

Embodiment A2. The network node of Embodiment A1, wherein the processing circuitry is further configured to provide an extended RS configuration to a location server.

Embodiment A3. The network node of Embodiment A1, wherein one RS per cell for time and frequency tracking purposes is transmitted.

Embodiment A4. The network node of Embodiment A1, wherein one two slot RS per cell with a burst periodicity for time and frequency tracking purposes is transmitted.

Embodiment B1. A method implemented in a network node, the method comprising: obtaining extended reference signal (RS) configurations from another network node; determining an extended RS waveform based on the extended RS configuration; and transmitting the extended RS waveform to the WD.

Embodiment B2. The method of Embodiment B1, wherein the method further includes providing an extended RS configuration to a location server;

Embodiment B3. The method of Embodiment B1, wherein one RS per cell for time and frequency tracking purposes is transmitted.

Embodiment B4. The method of Embodiment B 1, wherein one two slot RS per cell with a burst periodicity for time and frequency tracking purposes is transmitted.

Embodiment C1. A wireless device (WD) configured to communicate with a network node, the WD configured to, and/or comprising a radio interface and/or processing circuitry configured to:
obtain extended reference signal, RS, configurations from the network node;
determine a waveform associated with the extended RS;
detect a RS and estimate an associated time of arrival; and
send a measurement report to the network node based on the estimated time of arrival.

Embodiment C2. The WD of Embodiment C1, wherein the WD obtains a preconfigured extended RS.

Embodiment D1. A method implemented in a wireless device (WD), the method comprising:
obtaining extended reference signal, RS, configurations from the network node;
determining a waveform associated with the extended RS;
detecting a RS and estimate an associated time of arrival; and
sending a measurement report to the network node based on the estimated time of arrival.

Embodiment D2. The method of Embodiment D1, wherein the WD obtains a preconfigured extended RS.

What is claimed:
1. A network node configured to act as a transmission point and configured to communicate with a wireless device (WD), the network node comprising a radio interface and a processing circuitry configured to:
obtain extended reference signal (RS) configurations from another network node, the extended RS comprising a combination of a base signal and an additional positioning reference signal (APRS), the base signal comprising a tracking RS (TRS) having a TRS periodicity, and the APRS having an APRS periodicity that is a multiple of the TRS periodicity;

determine an extended RS waveform based on the extended RS configuration; and transmit the extended RS waveform to the WD.

2. The network node of claim 1, wherein another network node comprises a location server.

3. A method implemented in a network node, where the network node acts as a transmission point and is configured to communicate with a wireless device (WD), the method comprising:

obtain extended reference signal (RS) configurations from another network node, the extended RS comprising a combination of a base signal and an additional positioning reference signal (APRS), the base signal comprising a tracking RS (TRS) having a TRS periodicity, and the APRS having an APRS periodicity that is a multiple of the TRS periodicity;

determining an extended RS waveform based on the extended RS configuration; and transmitting the extended RS waveform to the WD.

4. The method of claim 3, wherein another network node comprises a location server.

5. The method of claim 3, wherein the additional signal comprises additional symbols.

6. The method of claim 3, wherein one RS per cell for time and frequency tracking purposes is transmitted.

7. The method of claim 3, wherein one two slot RS per cell with a burst periodicity for time and frequency tracking purposes is transmitted.

8. The method of claim 3, wherein the extended reference signal enables the determination of the position of the WD.

9. A wireless device (WD) configured to communicate with a network node, the WD comprising a radio interface and a processing circuitry configured to:

obtain extended reference signal (RS) configurations from another network node, the extended RS comprising a combination of a base signal and an additional positioning reference signal (APRS), the base signal comprising a tracking RS (TRS) having a TRS periodicity, and the APRS having an APRS periodicity that is a multiple of the TRS periodicity;

determine a waveform associated with the extended RS;

detect a RS and estimate an associated time of arrival; and send a measurement report to the network node based on the estimated time of arrival.

10. The WD of claim 9, wherein the WD obtains a preconfigured extended RS.

11. A method implemented in a wireless device, WD, where the WD is configured to communicate with a network node, the method comprising:

obtain extended reference signal (RS) configurations from another network node, the extended RS comprising a combination of a base signal and an additional positioning reference signal (APRS), the base signal comprising a tracking RS (TRS) having a TRS periodicity, and the APRS having an APRS periodicity that is a multiple of the TRS periodicity;

determining a waveform associated with the extended RS;

detecting a RS and estimate an associated time of arrival; and sending a measurement report to the network node based on the estimated time of arrival.

12. The method of claim 11, wherein the WD obtains a preconfigured extended RS.

13. The method of claim 11, wherein the additional positioning reference signal comprises additional symbols.

14. The method of claim 11, wherein the extended reference signal enables the determination of the position of the WD.

* * * * *